United States Patent
Miyamoto et al.

[11] Patent Number: 5,966,220
[45] Date of Patent: *Oct. 12, 1999

[54] ORIGIN DETECTOR IN IMAGE SCANNER

[75] Inventors: Kazunori Miyamoto; Kenji Nakanishi, both of Kashihara; Kenji Tanaka, Uji; Kazuya Masuda, Nara, all of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/785,512

[22] Filed: Jan. 17, 1997

[30] Foreign Application Priority Data

Jan. 19, 1996 [JP] Japan .................................. 8-007723

[51] Int. Cl.$^6$ ...................................................... H04N 1/04
[52] U.S. Cl. ........................... 358/475; 358/488; 358/474; 358/497
[58] Field of Search .................................... 358/475, 474, 358/488, 497; 382/106, 107, 286, 287, 291, 292, 293, 312, 317, 318, 319, 321, 323, 324

[56] References Cited

U.S. PATENT DOCUMENTS

| | | |
|---|---|---|
| 4,413,900 | 11/1983 | Abe et al. ..................................... 355/8 |
| 4,561,771 | 12/1985 | Sugiura ................................... 355/14 R |
| 4,693,595 | 9/1987 | Kunikawa et al. ......................... 355/77 |
| 5,109,288 | 4/1992 | Moriya ...................................... 358/488 |
| 5,161,029 | 11/1992 | Yamanishi ............................... 358/296 |
| 5,289,000 | 2/1994 | Toyofuku ................................ 358/497 |
| 5,570,206 | 10/1996 | Yoshinaga ............................... 358/497 |

FOREIGN PATENT DOCUMENTS

4-329531  11/1992  Japan .

*Primary Examiner*—Joseph Mancuso
*Assistant Examiner*—Hien Truong
*Attorney, Agent, or Firm*—David G. Conlin; William J. Daley, Jr.; Dike, Bronstein, Roberts & Cushman, LLP

[57] ABSTRACT

An apparatus according to the present invention includes a stepping motor (5) and a motor drive circuit (4) for first moving a lamp unit to hit the unit against a reference object opposite to an origin and then moving the unit toward the origin, a CPU (3) for measuring the distance through which the lamp unit is moved from the reference object toward the origin, and the CPU (3) for controlling the lamp unit so that the lamp unit stops at the origin according to the distance measured from the reference object.

4 Claims, 10 Drawing Sheets

| PHASE | 2-PHASE EXCITATION | | | | 1-2-PHASE EXCITATION | | | | | | | |
|---|---|---|---|---|---|---|---|---|---|---|---|---|
| | 1 | 2 | 3 | 4 | 1 | 2 | 3 | 4 | 5 | 6 | 7 | 8 |
| A | ● | ● | | | ● | ● | ● | | | | | |
| /A | | | ● | ● | | | | | ● | ● | ● | |
| B | ● | | | ● | | | ● | ● | ● | | | |
| /B | | ● | ● | | ● | | | | | | ● | ● |

● : EXCITED PHASE

ORIGIN DETECTOR IN IMAGE SCANNER

BACKGROUND OF THE INVENTION

1. Field of the Invention

The present invention relates to an origin detector for a lamp unit in an image scanner.

2. Description of the Related Art

The image scanner needs an origin (reference position) for a lamp unit to hold a reading start position. Thus conventional image scanners use a photosensor, a reed switch, or the like to detect a reference position. In the arrangement of a conventional image sensor in FIG. 3B, an output signal from a sensor 1 is linked with an interrupt terminal 2 also serving as an I/O port of a CPU 3, which performs interrupt operation by detecting the timing of turn-on and turn-off of the sensor at a rising edge and a falling edge.

Figure 5A:
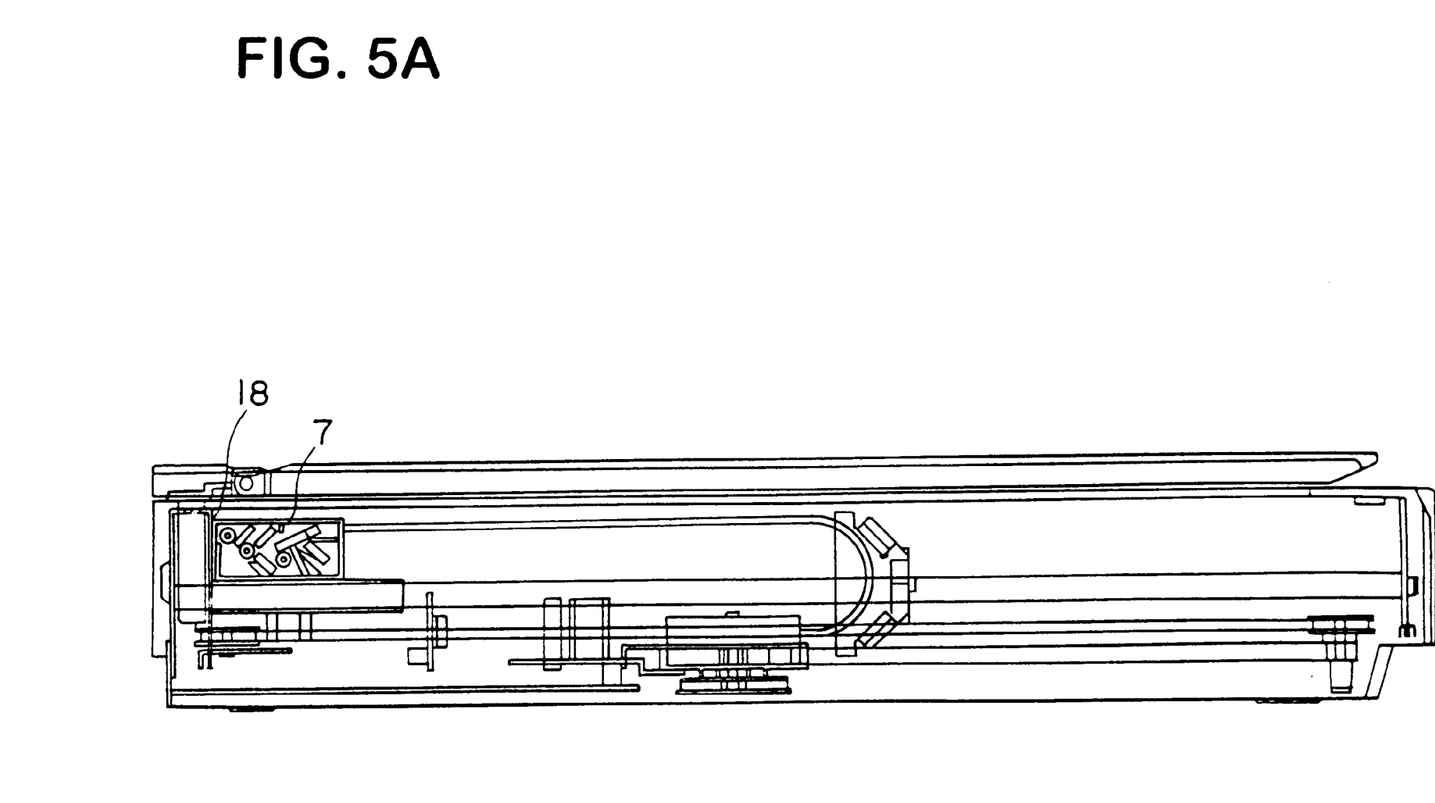
FIG. 5A shows a mechanism of a scanner according to the present invention.
Figure 5B:
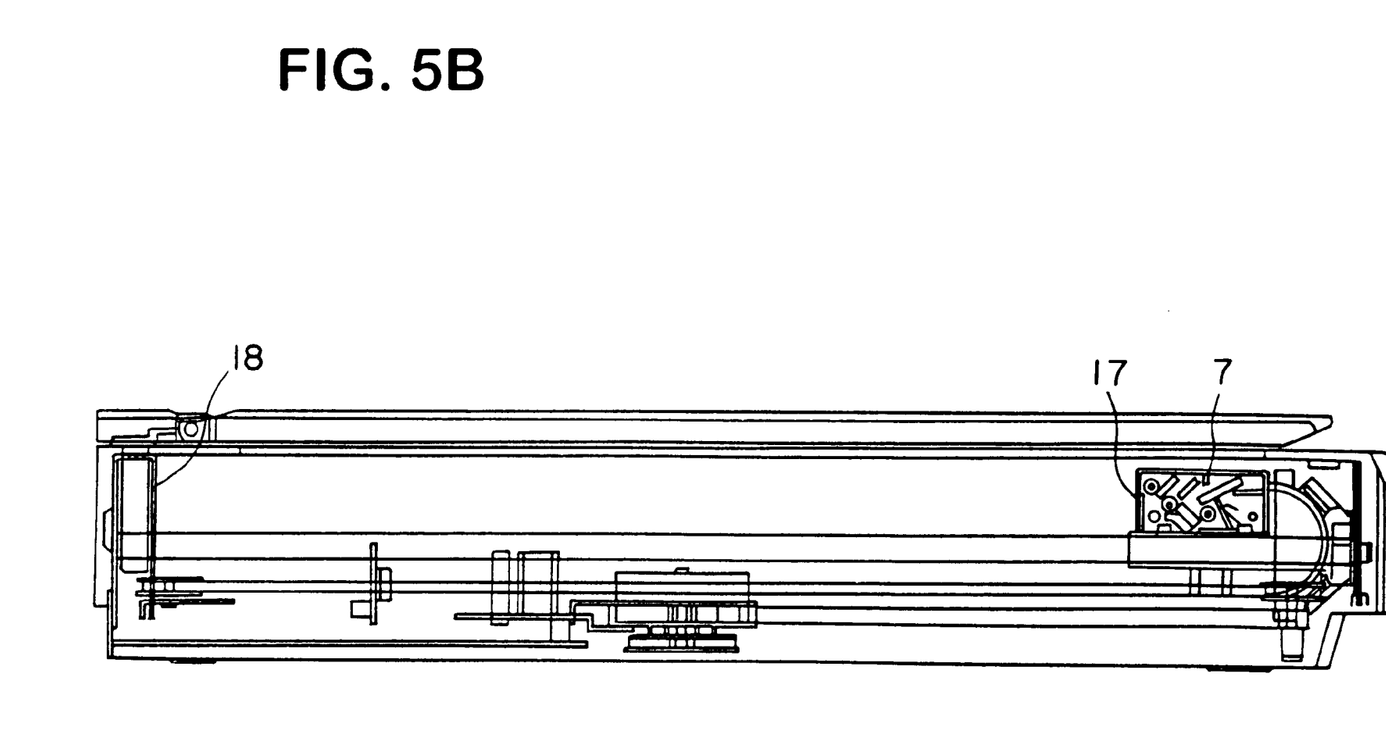
FIG. 5B shows a mechanism of a scanner according to the present invention.
Figure 5C:
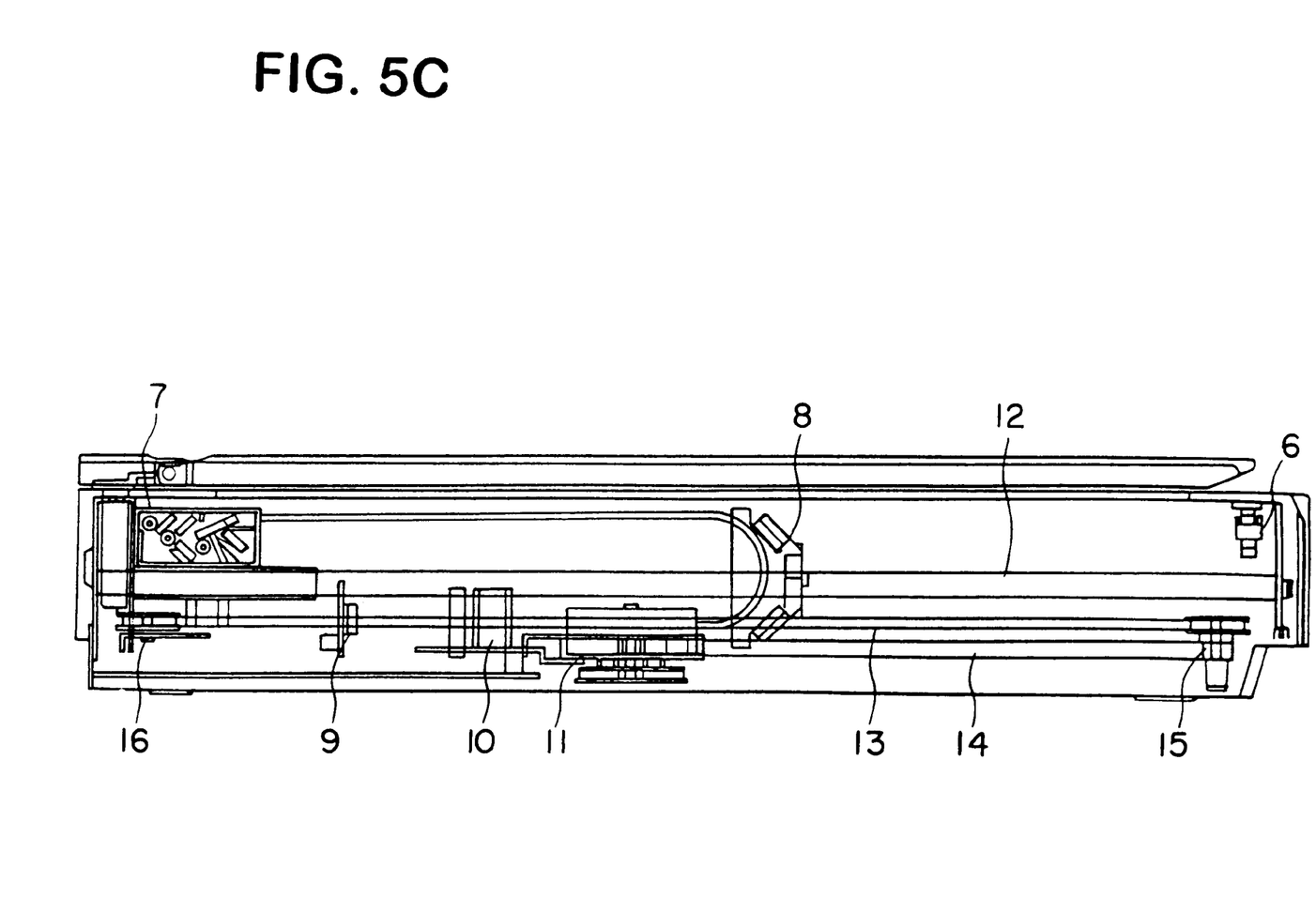
FIG. 5C shows a mechanism of a scanner according to prior art.

Referring now to FIG. 5C, the arrangement of a conventional scanner is described below. Numeral 7 indicates a lamp unit, which is arranged to be moved along a shaft 12 by a motor 11. Numeral 6 designates a home position sensor for detecting an origin for the lamp unit. Numerals 8, 9, and 10 indicate a mirror unit, a CCD for reading an image, and a lens, respectively. Numerals 13 and 14 designate belts, and numerals 15 and 16 represent pulleys.

Figure 2:
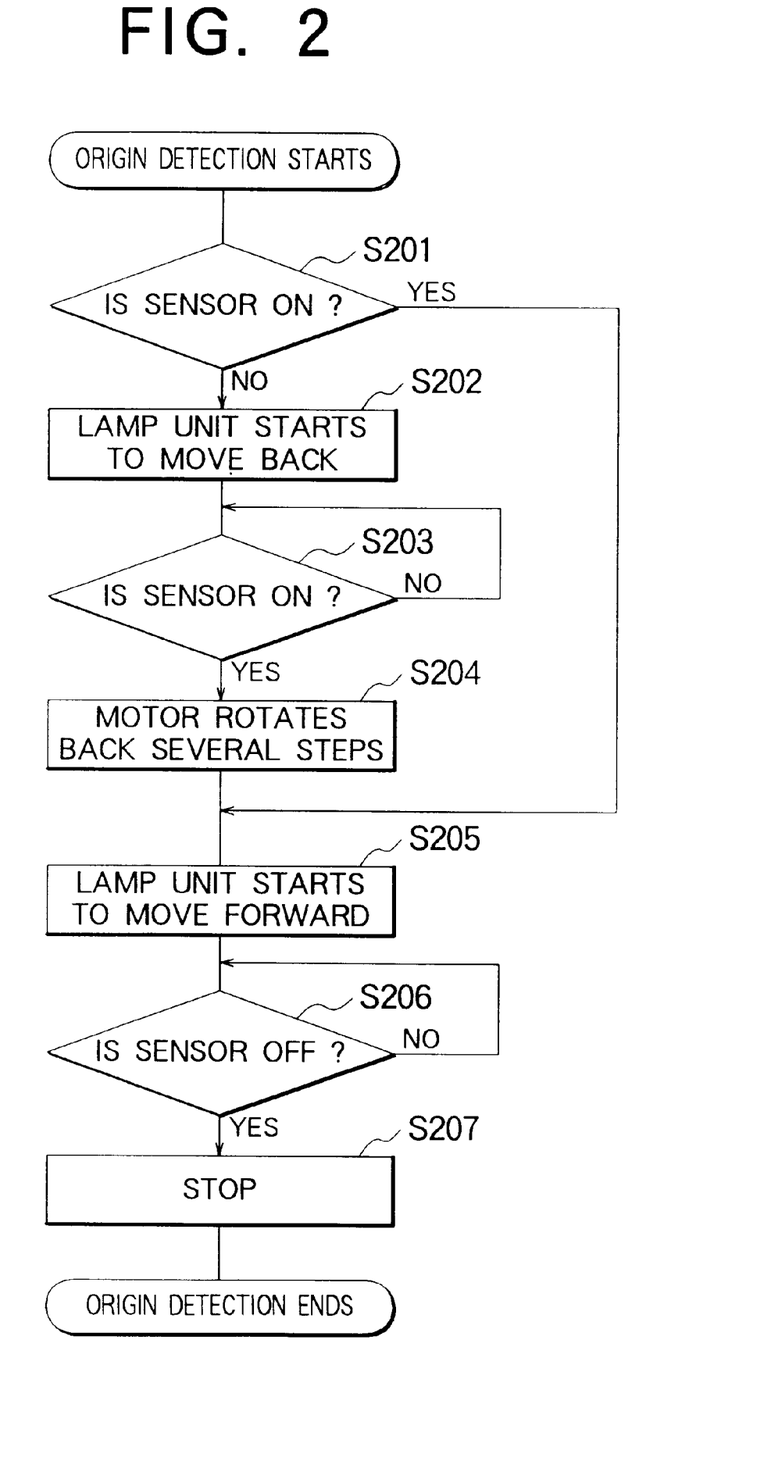
FIG. 2 shows an origin detection flowchart according to prior art.

Referring now to the flowchart in FIG. 2 and the arrangement of the scanner in FIGS. 5C and 5D, a conventional controlling method using a sensor is described below.

Sensor condition is checked immediately after the power is turned on (S201). If the sensor is off (the lamp unit is not in the position of the sensor) as shown in FIG. 5C, the lamp unit moves back toward the sensor (S202 and S203) until the sensor turns on (the lamp unit is in the position of the sensor). After the sensor turns on, the lamp unit further moves back a few steps to make sure that the sensor is on (S204). Then the lamp unit begins to move forward (S205) and stops (S207) at such a position that the sensor turns off (S206), that is, an origin.

Figure 5D:
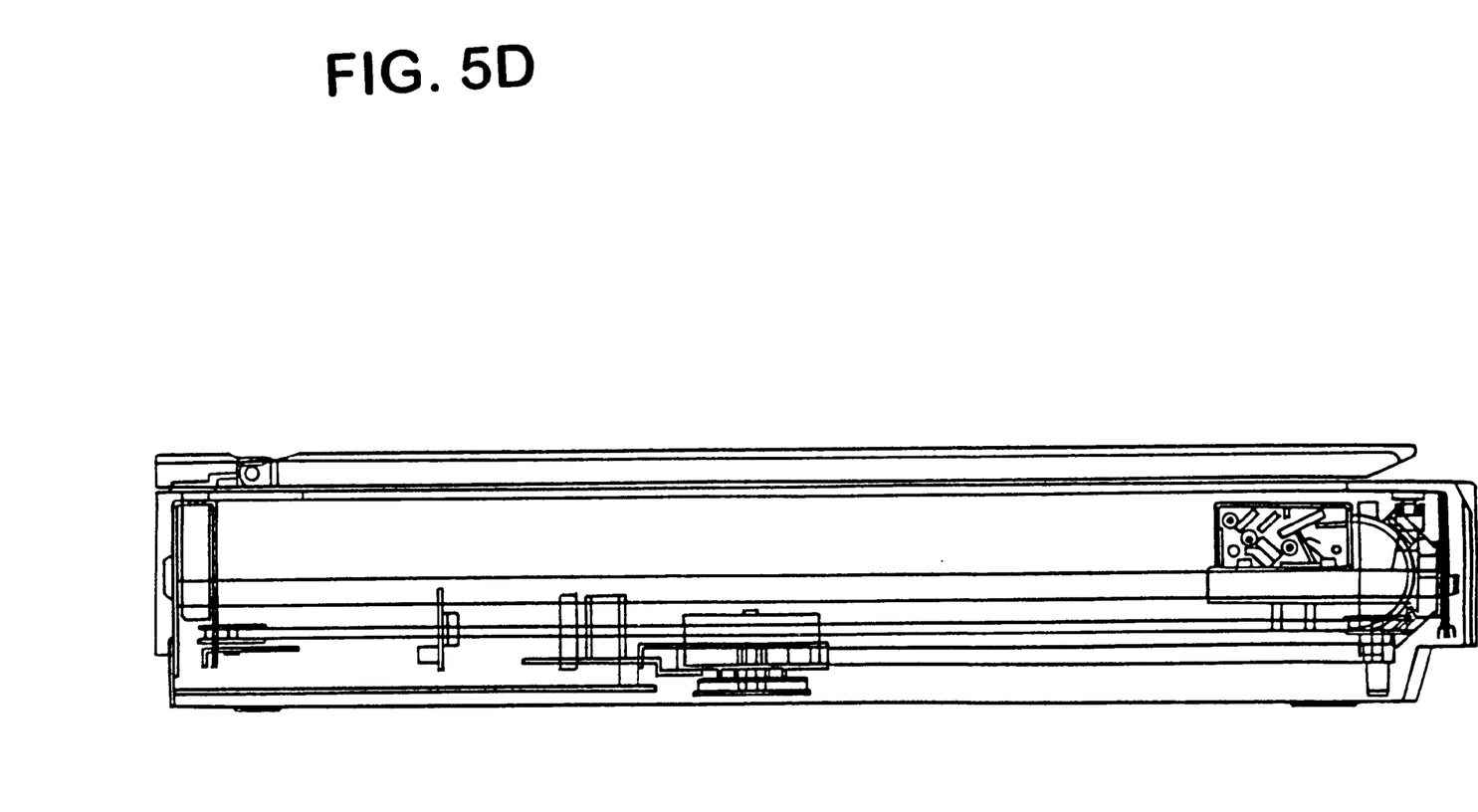
FIG. 5D shows a mechanism of a scanner according to prior art.

If the sensor is on as shown in FIG. 5D immediately after the power is turned on (S201), the lamp unit moves forward and stops at such a position that the sensor turns off, that is, an origin. This allows the previous operations (S202 to S204) to be omitted.

Such a position that the sensor is switched off is specified as an origin, since the range in which the sensor turns on cannot be neglected in relation with variations in the reading start position particularly if a reed switch is used.

A scanner using a conventional origin detector is disclosed in Japanese Patent Application Laying open (KOKAI) No. 4-329531.

Conventional origin detectors are expensive because they use a sensor. What is worse, conventional origin detectors need space for a sensor and cables, so that the detectors are prevented from being reduced in size. In addition, problems with assembly may arise because of installation variations. The present invention is made to solve the problems and provide an origin detector enabling a small inexpensive image scanner to be created.

SUMMARY OF THE INVENTION

It is therefore an object of the present invention to provide an origin detector which requires no sensor and thus is inexpensive and enables an image scanner to be small and inexpensive.

A further object of the invention is to provide an origin detector which has no problem with assembly due to installation variations.

These and other objects of the invention can be achieved by an apparatus comprising means for moving the lamp unit toward an origin after hitting the lamp unit against a reference object opposite to the origin, means for measuring the distance through which the lamp unit is moved from the reference object toward the origin, and means for controlling the lamp unit so that the unit stops at the origin according to the distance measured. Because the position of the origin is found by measuring the distance traveled from the reference object by the lamp unit, the apparatus eliminates the need for a sensor for detecting the position of the origin, thus reducing an image sensor in cost and size.

The means for moving the lamp unit may be a stepping motor, in that case the lamp unit is hit against the reference object at a speed which is in a through range and outside a resonance range. Hitting the lamp unit at such a speed reduces noise produced while the lamp unit is in motion and after the unit hits against the reference unit, since torque is small.

The distance traveled by the lamp unit toward the reference object may be set more than a predetermined maximum travel to hit the lamp unit against the reference object without failure. Since the lamp unit is moved the predetermined maximum travel, it can securely be hit against the reference object.

After the stepping motor steps out when the lamp unit hits against the reference object, the stepping motor is operated a few steps at a frequency less than a self-starting frequency to smoothly transfer the operation of the stepping motor to a slow-up table. Moving the stepping motor several steps at a frequency less than the self-starting frequency after the motor steps out allows the operation of the stepping motor to be smoothly transferred to the slow-up table.

Further objects and advantages of the present invention will be apparent from the following description of the preferred embodiments of the invention as illustrated in the accompanying drawings.

DESCRIPTION OF THE PREFERRED EMBODIMENTS

Figure 3A:
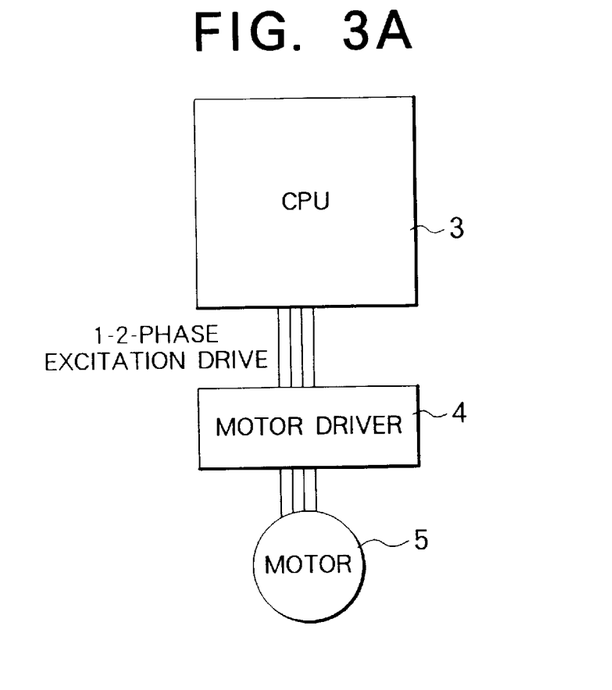
FIG. 3A is a block diagram showing an origin detector according to the present invention.
Figure 3B:
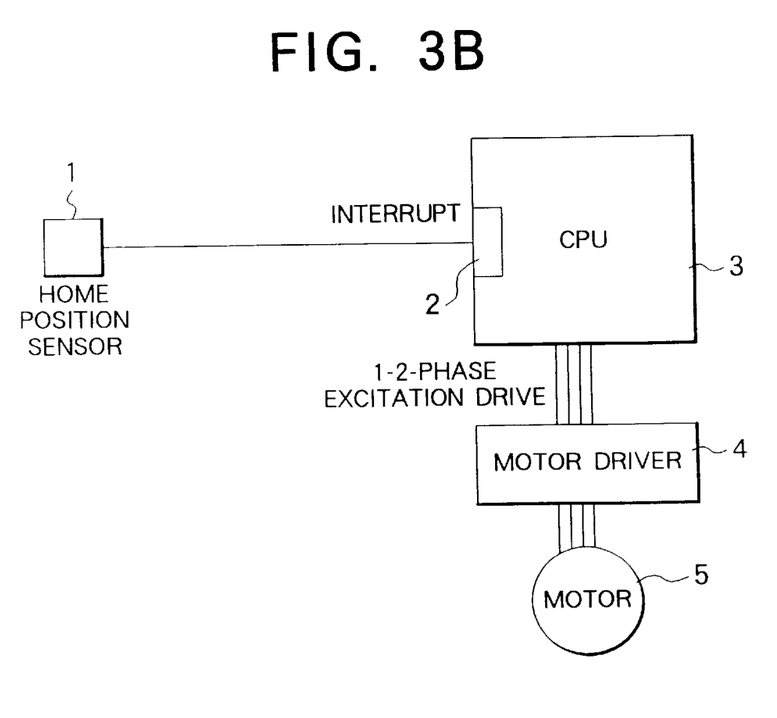
FIG. 3B is a block diagram showing an origin detector according to prior art.

FIG. 3A shows the arrangement of an embodiment of the present invention. Unlike the conventional apparatus in FIG. 3B, the embodiment needs no sensor.

Figure 1:
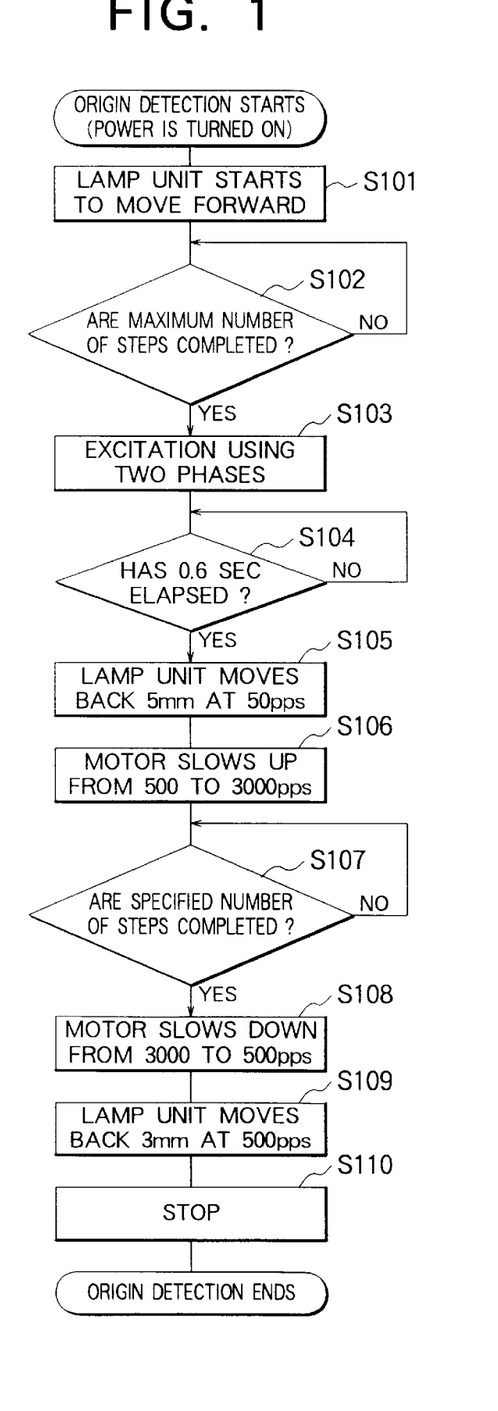
FIG. 1 shows an origin detection flowchart according to the present invention.
Figure 4:
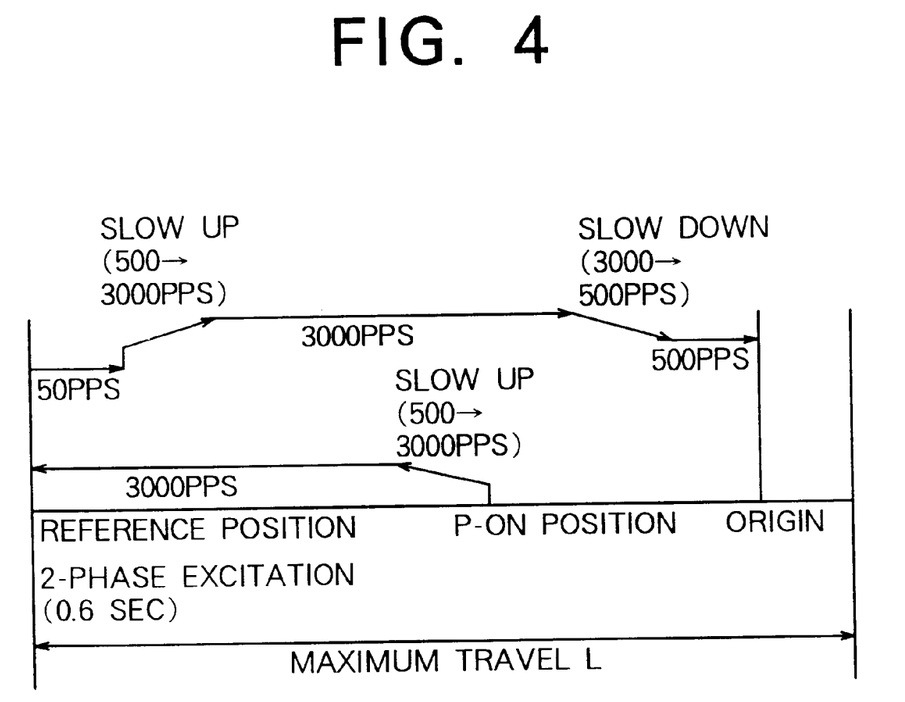
FIG. 4 shows a flow of operation of an origin detector according to the present invention.

Referring now to the flowchart of FIG. 1, the operation diagram of FIG. 4, and the scanner arrangement of FIGS. 5A and 5B, the effects of the present invention are described below.

Because the lamp unit 7 is at any position when the power is turned on, the CPU cannot locate the position. As shown in FIG. 5A, the lamp unit makes the stepping motor step out by moving forward to hit a contact 17 thereof against a cabinet 18 opposite to the origin, thereby detecting the reference position. The origin is calculated backward from the reference position. In this case, the stepping motor must be force operated a certain number of steps to make the motor step out without failure. The distance through which the motor is force moved is the maximum travel L in FIG. 4. Assuming that the feed per motor step is 800 dpi, the number of steps required to move the lamp unit the maximum travel L is represented by the equation L×800/25.4, where the unit for L is the millimeter, and one inch is 25.4 mm.

The lamp unit may be hit against a cabinet nearer to the origin. Since the lamp unit is usually near the origin, however, the stepping motor unfavorably steps out for a long time when it is operated steps corresponding to the maximum travel L.

Before the lamp unit is hit against a cabinet, the stepping motor is slowed up from 500 to 3000 pps to reduce noise while the motor steps out (S101). The lamp unit is likely to bounce back when hitting against the cabinet, because the unit is at a high speed. The amount of the bounce appears to be almost negligible, since the lamp unit hits against the cabinet.

Figure 6:
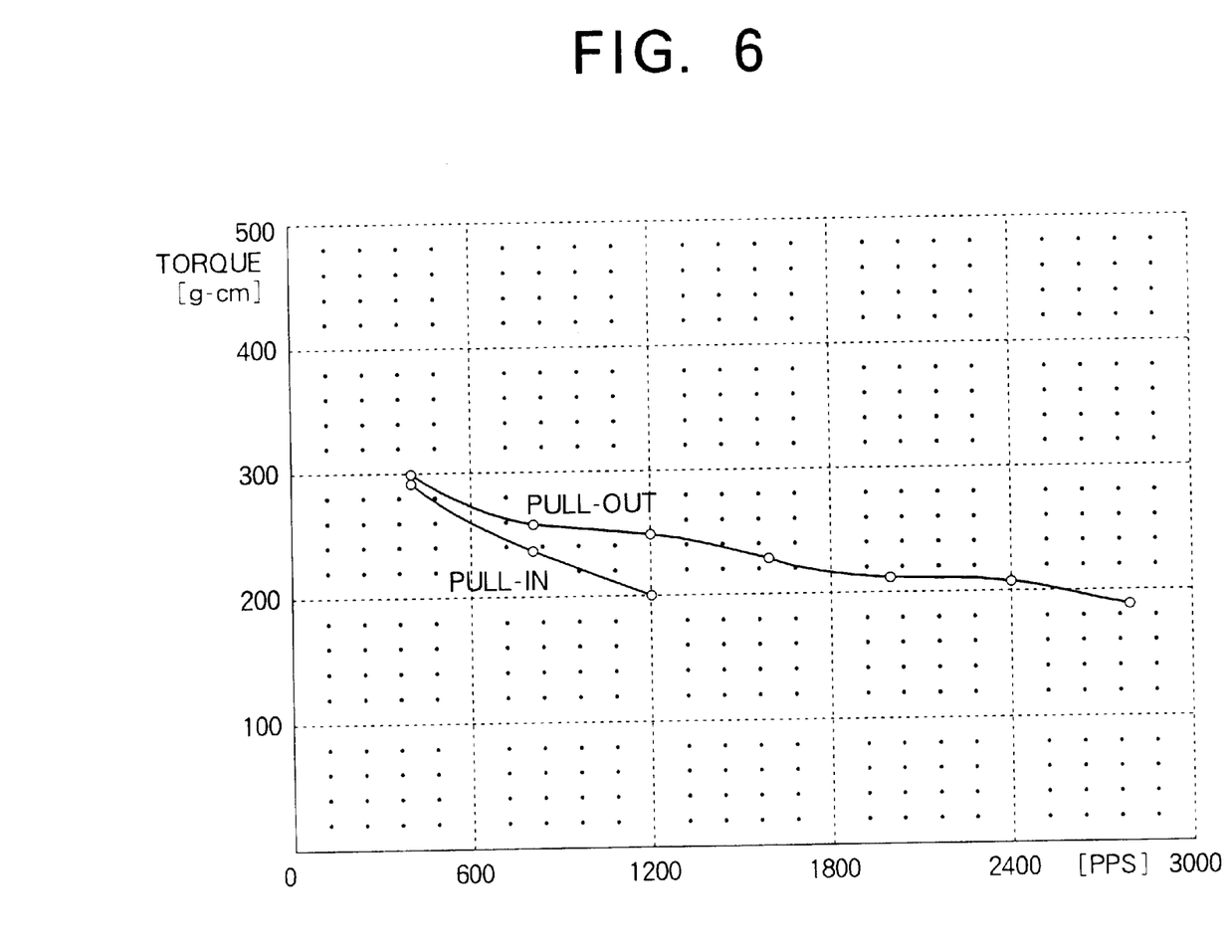
FIG. 6 shows motor torque curves.

To operate the stepping motor at a high speed, the speed thereof must be transferred from the self-starting range to the through range. The self-starting range is a range that allows the stepping motor to be started or stopped at a certain pulse rate with reference to load. On the other hand, the through range is a range that allows the stepping motor to respond without becoming asynchronous when the pulse rate or load torque is gradually increased beyond the self-starting range. The curve PULL-IN, one of the motor torque curves in FIG. 6, represents the maximum self-starting frequency, that is, the maximum pulse rate in the self-starting range, and the curve PULL-OUT, the other of the motor torque curves, represents the maximum response frequency, that is, the maximum pulse rate in the through range. The graphs in FIG. 6, plotted for the same motor and motor driver, with the current per phase kept constant, vary with conditions. The graphs give the maximum speed corresponding to a necessary torque. For example, the stepping motor can be started at 1200 pps if a torque of 200 g-cm or less is required, while the stepping motor must be started at 400 pps or less if a torque a little less than 300 g-cm is required. In other words, when the stepping motor is started, the torque of the motor must be set less than indicated by the curve PULL-IN. The maximum speed after slow-up must be set less than indicated by the curve PULL-OUT.

The resonance range is a range where if the frequency of vibration due to motor rotation is equal to or near the natural frequency of the housing containing the stepping motor, the housing resonates, so that the vibration thereof sharply becomes violent. The speed of the stepping motor must therefore be set outside the resonance range.

After step-out, the actual phase condition differs from the regular phase condition. To make the actual phase condition agree with the regular phase condition, in-phase excitation is performed for about 0.6 second using two phases (S103 and S104). Rotating the stepping motor through an angle equivalent to a 5-mm step at 50 pps below the self-starting frequency immediately after start-up (S105) and linking the operation of the stepping motor with the slow-up table allow the stepping motor to be smoothly operated (S106).

Figure 7:
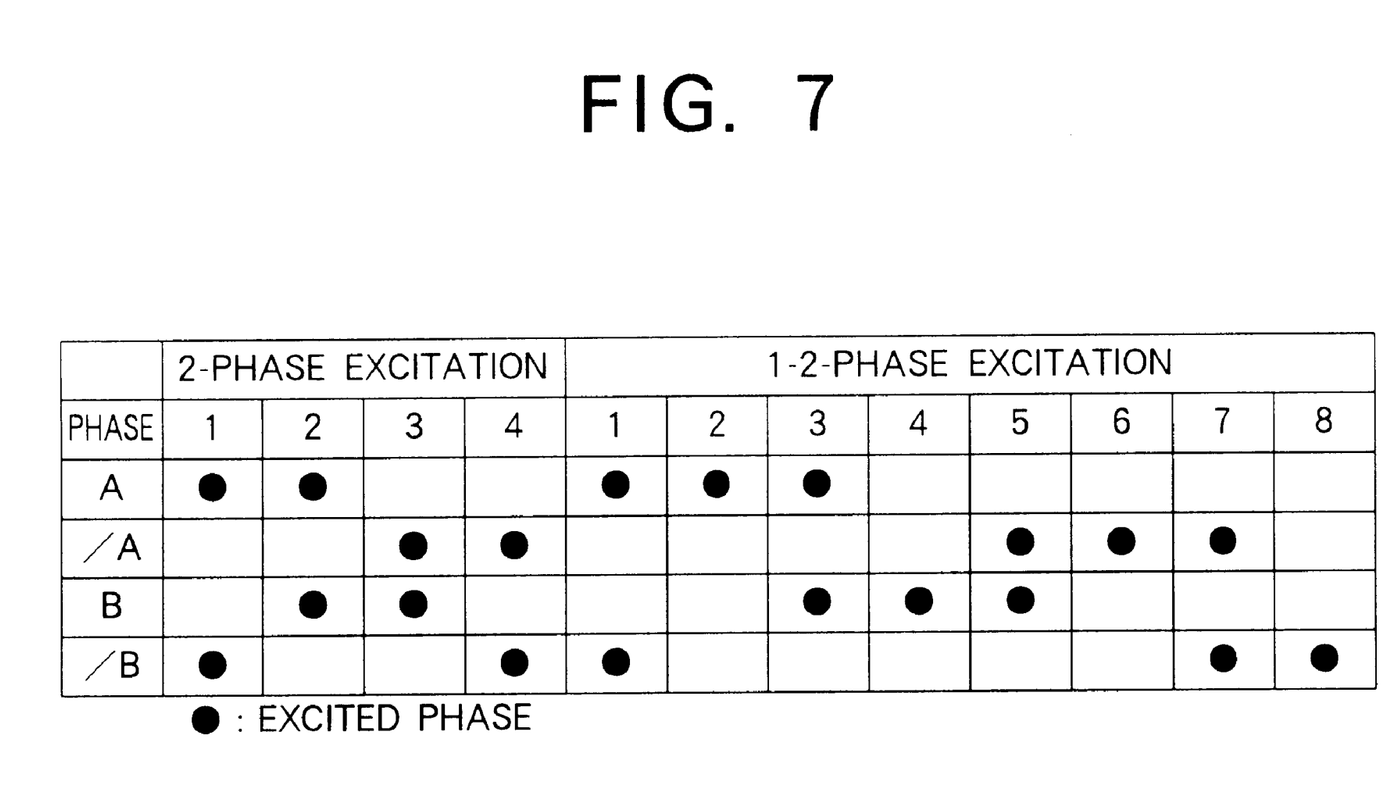
FIG. 7 shows motor phase control condition.

As shown in FIG. 7, to control the stepping motor, four patterns are switched to each other for 2-phase excitation, and eight patterns are switched to each other for 1-2-phase excitation. During normal operation, the actual phase condition always agrees with the regular phase condition controlled by the CPU. When the motor steps out, however, the actual phase condition disagrees with the regular phase condition. The probability that the regular phase condition disagrees with the actual phase condition is $7/8$ and $3/4$ for 1-2-phase excitation and 2-phase excitation, respectively. The number of steps through which the stepping motor is operated at 50 pps below the self-starting frequency must be at least seven steps or more and three steps or more for 1-2-phase excitation and 2-phase excitation, respectively.

After the distance between a reference position 18 for the contact and the origin, which distance is specified in steps (S107), is traveled, the lamp unit is returned to the origin using the stepping motor, and the position of the origin is constantly controlled until the power is turned off. The sequence described above allows the origin to be kept in position.

An origin detector according to the present invention enables image scanners to be reduced in cost and size, because the detector uses no sensor. The origin detector also has the effect of reducing electromagnetic interference (EMI) noise, since cables from the sensor, through which noise is conveyed, are eliminated together with the sensor itself.

An origin detector according to the present invention reduces noise which is produced when a lamp unit hits against a reference object and when a stepping motor steps out.

An origin detector according to the present invention allows an origin to be detected with a lamp unit at any position when the power is turned on.

An origin detector according to the present invention causes the operation of the stepping motor to be smoothly linked with a slow-up table without step-out.

Many widely different embodiments of the present invention may be constructed without departing from the spirit and scope of the present invention. It should be understood that the present invention is not limited to the specific embodiments described in the specification, except as defined in the appended claims.

What is claimed is:

1. An origin detector used for an image scanner, for detecting an origin for a movably installed lamp unit with a light source for reading an original, said origin detector comprising:

moving means for first moving said lamp unit in a first direction so said lamp unit hits against a reference object, the reference object being disposed opposite to the origin, and then moving said lamp unit in a second direction away from said reference object toward the origin, means for measuring a distance through which the lamp unit is moved in said second direction, and means for controlling said moving means, responsive to the distance measured by said measuring means so said lamp unit is stopped a specified distance from said reference object, whereby said lamp unit is disposed at the origin.

2. The origin detector according to claim 1, wherein said means for moving said lamp unit is a stepping motor, and said lamp unit is hit against said reference object at a speed which is in a through range and outside a resonance range.

3. The origin detector according to claim 1, wherein said lamp unit is moved toward said reference object through a distance longer than a predetermined maximum travel to hit said lamp unit against the reference object without failure.

4. The origin detector according to claim 1, wherein said means for moving said lamp unit is a stepping motor, and the operation of the stepping motor is smoothly transferred to a speedup table by operating said stepping motor through a predetermined number of steps at a frequency below a self-starting frequency after said stepping motor steps out when said lamp unit hits against the reference object.

* * * * *